(12) United States Patent
Andersson et al.

(10) Patent No.: US 10,865,822 B2
(45) Date of Patent: Dec. 15, 2020

(54) BENT CORNER FURNITURE CONNECTING PIECE AND A METHOD OF MAKING SUCH PIECE

(71) Applicant: IKEA SUPPLY AG, Pratteln (CH)

(72) Inventors: Fredrik Andersson, Färlöv (SE); Lars Paul Andersson, Ljungsbro (SE)

(73) Assignee: IKEA Supply AG, Pratteln (CH)

( * ) Notice: Subject to any disclaimer, the term of this patent is extended or adjusted under 35 U.S.C. 154(b) by 616 days.

(21) Appl. No.: 15/525,258

(22) PCT Filed: Nov. 11, 2015

(86) PCT No.: PCT/SE2015/051198
§ 371 (c)(1),
(2) Date: May 8, 2017

(87) PCT Pub. No.: WO2016/076783
PCT Pub. Date: May 19, 2016

(65) Prior Publication Data
US 2018/0283431 A1 Oct. 4, 2018

(30) Foreign Application Priority Data
Nov. 11, 2014 (SE) ...................................... 1451350

(51) Int. Cl.
*A47B 47/04* (2006.01)
*F16B 12/22* (2006.01)
*F16B 12/46* (2006.01)

(52) U.S. Cl.
CPC ............ *F16B 12/22* (2013.01); *A47B 47/042* (2013.01); *F16B 12/46* (2013.01); *Y10T 403/7096* (2015.01)

(58) Field of Classification Search
CPC ..... A47B 47/005; A47B 47/04; A47B 47/042; F16B 5/0614; F16B 12/02; F16B 12/22;
(Continued)

(56) References Cited

U.S. PATENT DOCUMENTS 3,688,458 A 9/1972 Inmon et al.
3,985,083 A 10/1976 Pofferi
(Continued)

FOREIGN PATENT DOCUMENTS

CN 1502014 A 6/2004
FR 2289788 A1 5/1976
(Continued)

OTHER PUBLICATIONS

International Search Report for PCT/SE2015/051198, dated Feb. 22, 2016.
(Continued)

*Primary Examiner* — Josh Skroupa
(74) *Attorney, Agent, or Firm* — Merchant & Gould P.C.

(57) ABSTRACT

A bent corner furniture connecting piece (18) comprises a central bent corner section (89) having a first connecting arrangement (93), and a second connecting arrangement (97). The connecting piece (18) comprises a wooden frame (36) comprising a first and a second curved end section piece (26, 28). First and second connecting pieces (30, 32) connect the first and second curved end section pieces (26, 28). The first connecting piece (30) is provided with the first connecting arrangement (93) for connection to a first furniture piece, and the second connecting piece (32) is provided with the second connecting arrangement (97) for connection to a second furniture piece. A bent outer surface layer (64) is arranged on a convex part (74) of said frame (36), and a bent inner surface layer (66) is arranged on a concave part (82) of said frame (36).

21 Claims, 7 Drawing Sheets

(58) Field of Classification Search
CPC .......... F16B 12/26; F16B 12/34; F16B 12/38; F16B 12/46; F16B 12/50; F16B 2012/463; Y10T 403/42; Y10T 403/555; Y10T 403/7096; Y10T 403/74
USPC .................. 403/205, 295, 383, 404, DIG. 10, 403/DIG. 11, DIG. 13; 312/263, 265.5
See application file for complete search history.

(56) References Cited

U.S. PATENT DOCUMENTS

| | | | |
|---|---|---|---|
| 6,883,882 B2* | 4/2005 | Lin | A47B 47/042 |
| | | | 312/263 |
| 9,447,804 B2* | 9/2016 | Andersson | F16B 12/22 |
| 2004/0217678 A1 | 11/2004 | Lin | |
| 2006/0207957 A1 | 9/2006 | Chen | |
| 2013/0239509 A1 | 9/2013 | Wang | |

FOREIGN PATENT DOCUMENTS

| | | |
|---|---|---|
| GB | 146512 A | 12/1920 |
| KR | 20020070235 A | 9/2002 |

OTHER PUBLICATIONS

Office Action for Chinese Patent Application No. 201580060056.9, dated Aug. 3, 2018.
Search Report for European Patent Application No. 15858562.0, dated May 25, 2018.

* cited by examiner

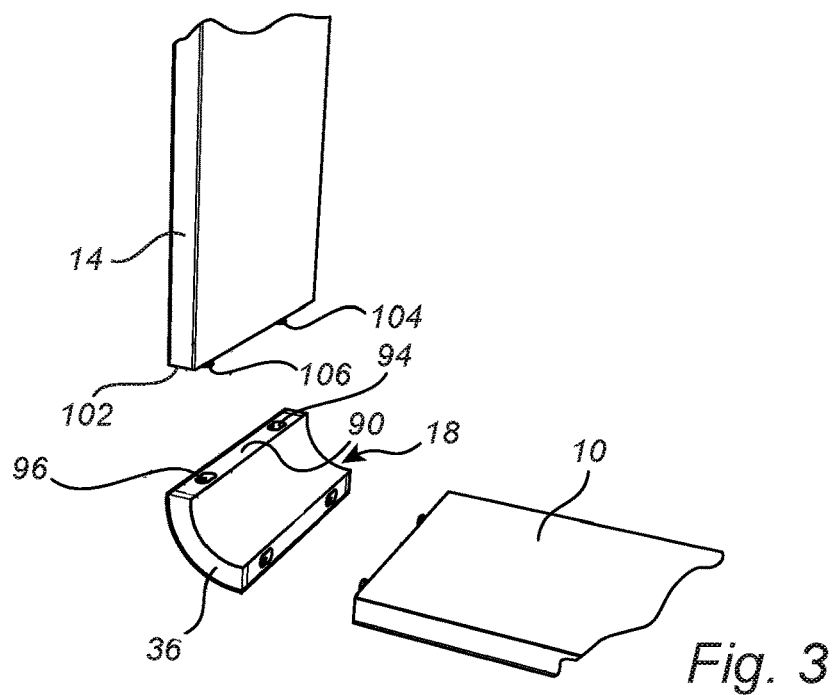
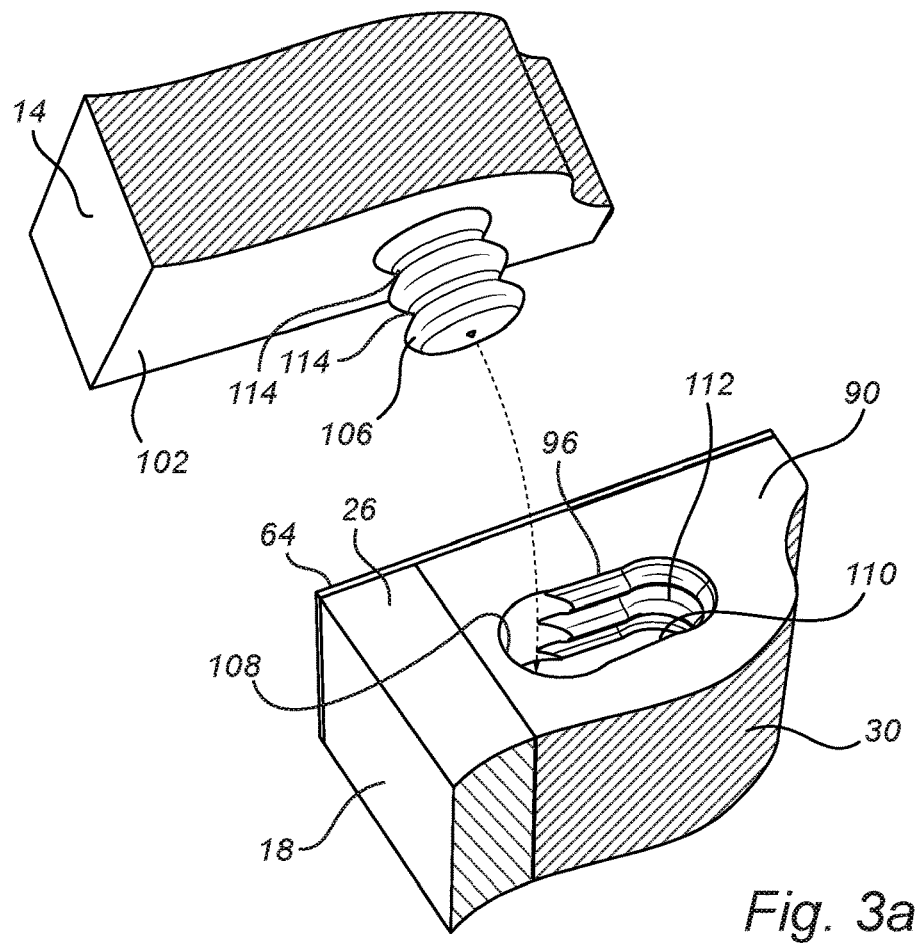

BENT CORNER FURNITURE CONNECTING PIECE AND A METHOD OF MAKING SUCH PIECE

FIELD OF THE INVENTION

The present invention relates to a bent corner furniture connecting piece comprising a central bent corner section, a first connecting arrangement arranged in a first end of the central bent corner section and adapted for connection to a first furniture piece, and a second connecting arrangement arranged in a second end of the central bent corner section, which second end is opposite to the first end, and adapted for connection to a second furniture piece.

The present invention further relates to a method of forming a bent corner furniture connecting piece.

BACKGROUND OF THE INVENTION

Home furnishing objects, such as book cases, shelves, cabinets, etc., often comprises two or more furniture panels that are to be connected to each other. For example, a horizontal piece may be connected to a vertical side piece. Often horizontal and vertical pieces of home furnishing objects are connected to each other at a sharp corner, causing a risk of injuries to people living in the home in question. By using a bent corner furniture connecting piece for connecting the horizontal and vertical pieces to each other the risk of injuries can be substantially reduced.

US 2006/0207957 discloses a user configurable display having shelves that fit within rounded corner profiles. The rounded corner profiles are made from extruded aluminium profiles.

SUMMARY OF THE INVENTION

An object of the present invention is to provide a bent corner furniture connecting piece which has a lower weight than the known bent corner furniture connecting piece.

This object is achieved by means of a bent corner furniture connecting piece comprising a central bent corner section, a first connecting arrangement arranged in a first end of the central bent corner section and adapted for connection to a first furniture piece, and a second connecting arrangement arranged in a second end of the central bent corner section, which second end is opposite to the first end, and adapted for connection to a second furniture piece, wherein the first and second connecting arrangements are arranged at an angle (α1) of 25-140° to each other, wherein the bent corner furniture connecting piece comprises a wooden frame comprising a first curved end section piece and a second curved end section piece, wherein a first connecting piece connects the first and second curved end section pieces at respective first ends thereof, and wherein a second connecting piece, which is parallel to the first connecting piece, connects the first and second curved end section pieces at respective second ends thereof, said second ends being opposite to said first ends of said curved end section pieces, wherein said first connecting piece is provided with at least a part of the first connecting arrangement for connection to a first furniture piece, and wherein said second connecting piece is provided with at least a part of the second connecting arrangement for connection to a second furniture piece, wherein a bent outer surface layer is arranged on a convex part of said frame, and wherein a bent inner surface layer is arranged on a concave part of said frame.

An advantage of this invention is that the connecting pieces both form parts of a frame for the bent corner furniture connecting piece and additionally also are provided with at least a part of first and second connecting arrangements so that the bent corner furniture connecting piece in an efficient manner both becomes a structural element of the piece of furniture, and, additionally, connects to the first and second furniture pieces. The wooden frame provides the bent corner furniture connecting piece with high strength and low weight and makes it possible to manufacture the bent corner furniture connecting piece at a low price.

According to one embodiment the first connecting arrangement is arranged for snap-in-connection to the first furniture piece. An advantage of this embodiment is that it provides for efficient and fast mounting of the connecting arrangement to the first furniture piece. Preferably the second connecting arrangement is also arranged for snap-in-connection to the second furniture piece. This provides for efficient mounting of also the second furniture piece.

According to one embodiment the first connecting arrangement comprises at least a first connecting device of which at least a part is arranged in the first connecting piece, and wherein the second connecting arrangement comprises at least a first connecting device of which at least a part is arranged in the second connecting piece. The connecting devices provide for efficient mounting of furniture pieces to the bent corner furniture connecting piece.

According to one embodiment the first connecting devices of the bent corner furniture connecting piece are arranged for snap-in-connection to the first and second furniture pieces, respectively. An advantage of this embodiment is that the bent corner furniture connecting piece provides for a simple and quick mounting of a piece of furniture, such that also a layman can mount the piece of furniture easily and quickly.

According to one embodiment the first and second connecting arrangements are arranged for releasable connection to the first and second furniture pieces, respectively. An advantage of this embodiment is that the piece of furniture easily can be taken apart, which is an advantage upon, for example, moving the piece of furniture, or reassembling the piece of furniture to another arrangement.

According to one embodiment a first connecting device is in its entirety arranged in said first connecting piece. An advantage of this embodiment is that the first connecting device obtains a particularly strong connection to the connecting piece.

According to one embodiment a first connecting device is in its entirety arranged in said second connecting piece. An advantage of this embodiment is that the first connecting device obtains a particularly strong connection to the connecting piece.

According to one embodiment the first and second connecting pieces have the form of first and second rod-shaped connecting pieces. An advantage of this embodiment is that rod-shaped connecting pieces are particularly efficient for forming a strong and light-weight frame.

According to one embodiment the first and second connecting arrangements of the bent corner furniture connecting piece each comprises one part of a female-and-male connecting arrangement. An advantage of this embodiment is that female-and-male connecting arrangements provides for easy mounting, and it is easy for a layman to see how the bent corner furniture connecting piece is to be connected to first and second furniture pieces.

According to one embodiment at least the first connecting arrangement of the bent corner furniture connecting piece comprises at least one female part. This embodiment provides for an efficient arrangement of the connecting arrangement, and makes the bent corner furniture connecting piece a simple piece taking up relatively little space. Preferably, also the second connecting arrangement comprises at least one female part, for further improved efficiency and reduced space requirement.

According to one embodiment the first and second connecting arrangements comprises solely female parts. This provides for a particularly reduced space requirement of the bent corner furniture connecting piece.

According to one embodiment at least the first connecting arrangement of the bent corner furniture connecting piece comprises one part of a key and key hole connecting arrangement. An advantage of this embodiment is that a layman can easily understand how the piece of furniture is to be mounted. Furthermore, a mechanically strong attachment is achieved. Preferably, also the second connecting arrangement comprises one part of a key and key hole connecting arrangement, for further improved ease of mounting and improved mechanical strength.

According to one embodiment the wooden frame has the general shape of a cradle undercarriage. An advantage of this embodiment is that the wooden frame obtains high mechanical strength, and that it becomes easy to apply, in a mechanically stable manner, the inner and outer surface layers thereto.

According to one embodiment the inner and outer surface layers are made from wood or a wooden based material, such as chipboard material, particle board material, MDF board material, HDF board material. An advantage of this embodiment is that the bent corner furniture connecting piece can be made entirely from wooden materials, which provides the piece of furniture with a combination of high mechanical strength, low weight, low cost, and fulfils requirements with regard to sustainability.

According to one embodiment the first and second connecting arrangements are arranged at an angle $\alpha 1$ of 25-90° to each other. This range of the angle $\alpha 1$ has been found to be suitable for most furniture applications.

According to one embodiment the bent corner furniture connecting piece has an inner radius Ri of at least 50 mm. A radius Ri of less than 50 mm tends to result in a reduced strength of the connecting piece, and difficulties in securing the inner and outer layers properly to the frame.

According to one embodiment the bent corner furniture connecting piece has an inner radius Ri of less than 150 mm. A radius Ri of more than 150 mm tends to result in a bent corner connecting piece requiring extensive internal reinforcement, thereby increasing the weight and cost.

According to one embodiment the bent corner furniture connecting piece has a total thickness Ttot of 15-50 mm. A thickness Ttot of less than 15 mm tends to result in a connecting piece having relatively low mechanical strength. A thickness Ttot of more than 50 mm tends to require extensive internal reinforcement of the connecting piece to obtain sufficient mechanical strength, thereby increasing the weight and cost of the connecting piece.

According to one embodiment the bent corner furniture connecting piece has a hollow interior space. An advantage of this embodiment is that the weight and cost of the corner connecting piece is reduced.

According to one embodiment the respective connecting arrangement comprises at least a first and a second connecting device that are arranged at a distance from each other, as seen along the respective connecting piece. An advantage of this embodiment is that a more stable connection to the respective furniture piece is obtained.

According to one embodiment the first and second curved end section pieces are banana-shaped. The banana shape is efficient in production and provides an efficient manner of forming a frame for a bent corner furniture connecting piece.

A further object of the present invention is to provide an efficient method of forming a bent corner connecting piece adapted for connection to a first furniture piece and to a second furniture piece.

This object is achieved by means of a method of forming a bent corner furniture connecting piece adapted for connection to a first furniture piece and to a second furniture piece in the assembly of a piece of furniture, the method comprising:

forming a wooden frame by connecting a first connecting piece to first and second curved end section pieces at respective first ends thereof, and connecting a second connecting piece to the first and second curved end section pieces at respective second ends thereof, applying an outer surface layer on a convex part of said frame, applying an inner surface layer on a concave part of said frame, arranging at least a first connecting arrangement, adapted for connection to a first furniture piece, at least partly in the first connecting piece, and arranging at least a second connecting arrangement, adapted for connection to a second furniture piece, at least partly in the second connecting piece.

An advantage of this method is that a bent corner furniture connecting piece having high mechanical strength and low weight can be manufactured at a low cost.

According to one embodiment the outer and inner surface layers are glued to the frame. An advantage of this embodiment is that the bent corner furniture connecting piece can be manufactured at a high speed and low cost, and that the resulting connecting piece obtains a high strength.

According to one embodiment said steps of applying an outer surface layer on a convex part of said frame and applying an inner surface layer on a concave part of said frame involves sandwiching the frame between the outer and inner surface layers and pressing the sandwiched structure obtained thereby in a pressing arrangement comprising a die and a stamp. An advantage of this embodiment is that a bent corner furniture connecting piece with a high mechanical strength can be manufactured without having to pre-form flat surface layers to a specific curvature, since the desired curvature is obtained in the pressing.

According to one embodiment said step of pressing the sandwiched structure further involves heating the sandwiched structure to a temperature in the range of 50-200° C. An advantage of this embodiment is that a bending of flat surface layers around the frame is efficiently achieved. Furthermore, a temperature in this range is efficient for quickly curing any glue or adhesive used for attaching the surface layers to the frame.

According to one embodiment a layer of glue is applied on the frame and/or on the outer and/or inner surface layers prior to pressing the sandwiched structure. An advantage of this embodiment is that bending the surface layers to a suitable curvature to fit with the frame and curing the glue can be obtained in one step, thereby making the manufacture of a bent corner furniture connecting piece more efficient.

According to one embodiment the frame is sandwiched between oversized outer and inner surface layers that are subsequently machined to fit with the frame. An advantage of this embodiment is that the placing of frame and surface layers in relation to each other becomes less sensitive, and it is still possible to obtain a high precision in the location of the first connecting devices.

According to one embodiment said step of arranging at least a first connecting arrangement for connection to a first furniture piece in the first connecting piece includes milling at least one female part at least partly in the first connecting piece. An advantage of this embodiment is that connecting arrangements can be formed efficiently in the bent corner furniture connecting piece without requiring any extra parts.

According to a further aspect of the present invention there is provided a consumer mountable piece of furniture, which comprises at least one bent corner furniture connecting piece of any of the embodiments described hereinabove, and/or made according to a method described hereinabove, a first furniture piece connectable to the first connecting arrangement of the connecting piece, and a second furniture piece connectable to the second connecting arrangement of the connecting piece. An advantage of this piece of furniture is that it makes it possible for a consumer, being a layman in furniture mounting, to mount also relatively complicated pieces of furniture.

According to one embodiment the first and second furniture pieces are releasably mountable to the connecting piece. This provides for possibilities of dismantling the consumer mountable piece of furniture, for example when moving it from one place to another.

Examples of consumer mountable pieces of furniture which may include one or more bent corner furniture connecting pieces for making the piece of furniture easier to mount include: book cases, wall shelves, chests of drawers, television benches, cabinets, sideboards, tables, storage furniture, chairs, etc.

Further objects and features of the present invention will be apparent from the description and the claims.

BRIEF DESCRIPTION OF THE DRAWINGS

The invention will now be described in more detail with reference to the appended drawings in which:

FIG. 3 illustrates a first step of mounting the piece of furniture by connecting the bent corner furniture connecting piece to a side piece of the piece of furniture, and to a bottom piece of the piece of furniture.

FIG. 3a is a perspective view illustrating the connection depicted in FIG. 3.

DESCRIPTION OF PREFERRED EMBODIMENTS

Figure 1:
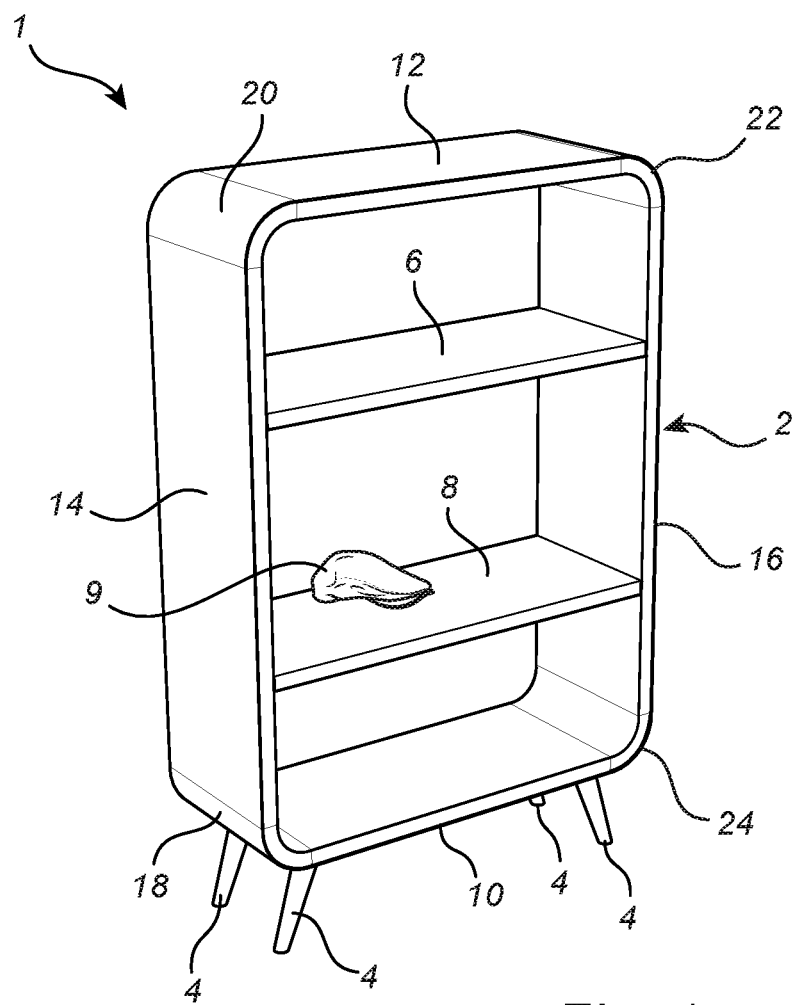
FIG. 1 is a perspective view and illustrates a piece of furniture.

FIG. 1 illustrates a consumer mountable piece of furniture 1. By "consumer mountable piece of furniture" is meant a piece of furniture that a customer buys as a kit of furniture parts in a store and the customer then mounts the parts of the kit together in hers or his own home to form the piece of furniture. The customer would be expected to have the skills of the average private person, and would only be expected to use ordinary tools, if any, that are available in most private homes or that could be provided together with the kit of parts when sold at the store. Examples of such ordinary tools include a screw driver and a hex key. The piece of furniture 1, which in this embodiment is a book case, comprises a cabinet part 2 which is mounted on legs 4 and which supports first and second shelves 6 and 8 that are adapted for storing various objects 9, such as books, decorative objects, pieces of clothing, etc.

The cabinet part 2 comprises a horizontal bottom part 10, a horizontal top part 12, and first and second side walls 14, 16. A first bent corner furniture connecting piece 18 connects the horizontal bottom part 10 to the first side wall 14, a second bent corner furniture connecting piece 20 connects the first side wall 14 to the horizontal top part 12, a third bent corner furniture connecting piece 22 connects the horizontal top part 12 to the second side wall 16, and a fourth bent corner furniture connecting piece 24 connects the second side wall 16 to the horizontal bottom part 10. As will be described in more detail hereinafter, a customer buys a kit of parts comprising the bent corner furniture connecting pieces 18, 20, 22, 24, the bottom and top parts 10, 12, the first and second side walls 14, 16, the shelves 6, 8, and the legs 4 as separate parts, and the customer then mounts them together to form the ready piece of furniture 1 illustrated in FIG. 1. While the legs 4 and the shelves 6, 8 could be mounted in any per se known manner, the way of mounting the cabinet 2, and the specific pieces included therein, will be described in more detail hereinafter.

Figure 2A:
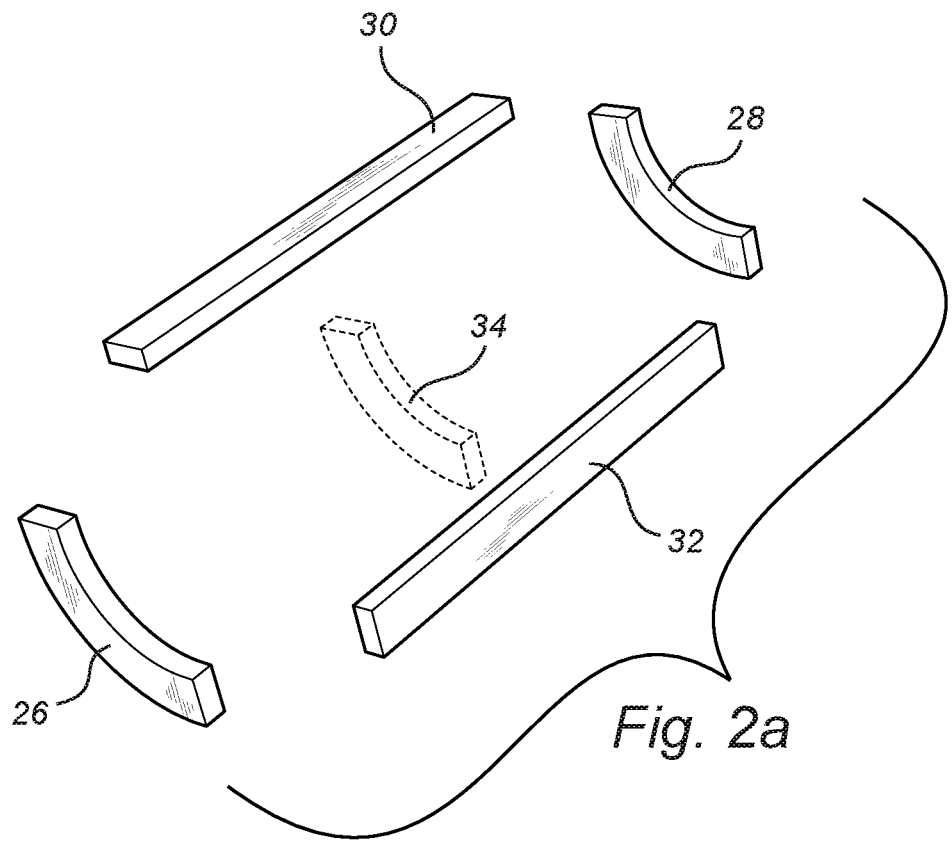
FIG. 2a is a perspective view and illustrates pieces intended for forming a frame of a bent corner furniture connecting piece.

FIG. 2a illustrates pieces for forming a type of frame used in each of the bent corner furniture connecting pieces 18, 20, 22, 24 illustrated in FIG. 1. These pieces include a first curved end section piece 26, having the general shape of a banana, and opposite thereto, a second curved end section piece 28, also having the general shape of a banana. Furthermore, a first rod-shaped connecting piece 30 is adapted to extend from the first end section piece 26 to the second end section piece 28. A second rod-shaped connecting piece 32 is arranged to be parallel to the first connecting piece 30 and to extend from the first end section piece 26 to the second end section piece 28. Each of the end section pieces 26, 28 and the connecting pieces 30, 32 is made from a wood based material, for example from pure wood or of a wooden based material, such as chipboard material, particle board material, MDF board material, HDF board material.

Optionally, one or more banana-shaped support pieces 34 may be arranged parallel to the first and second end section pieces 26, 28, and between the end section pieces 26, 28, to connect the first and second connecting pieces 30, 32 in at least one position between the end section pieces 26, 28 to form a reinforcement of the frame.

Figure 2B:
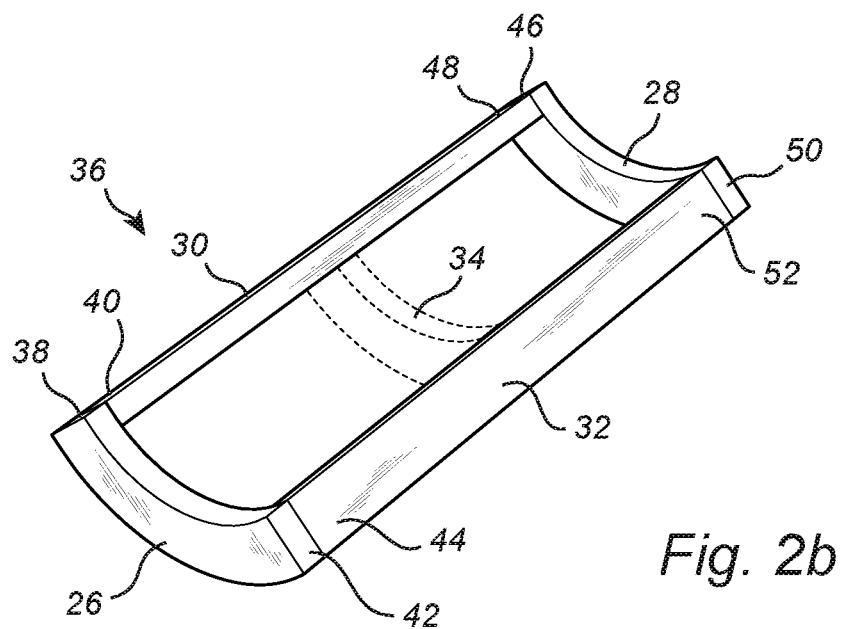
FIG. 2b is a perspective view and illustrates a frame of the connecting piece.

FIG. 2b illustrates an assembled frame 36 intended for forming a bent corner furniture connecting piece.

A first distal end 38 of the first banana-shaped end section piece 26 has been connected to a first distal end 40 of the first rod-shaped connecting piece 30. A second distal end 42 of the first banana-shaped end section piece 26, which second distal end 42 is opposite to the first distal end 38, has been connected to a first distal end 44 of the second rod-shaped connecting piece 32. Furthermore, a first distal end 46 of the second banana-shaped end section piece 28 has been connected to a second distal end 48, which is opposite to the first distal end 40, of the first rod-shaped connecting piece 30. A second distal end 50 of the second banana-shaped end section piece 28, which second distal end 50 is opposite to the first distal end 46, has been connected to a second distal end 52, which is opposite to the first distal end 44, of the second rod-shaped connecting piece 32. Each of the connections between the banana-shaped end section pieces 26, 28 and the rod-shaped connecting pieces 30, 32 can be formed by, for example, gluing, and/or screw attachment, and/or other attachment means.

In the embodiment shown in FIG. 2b the first and second rod-shaped connecting pieces 30, 32 are embraced between the banana-shaped end section pieces 26, 28. It will be appreciated that other arrangements are possible, for example with the banana-shaped end section pieces 26, 28 being embraced between the first and second rod-shaped connecting pieces 30, 32.

Optionally, the banana-shaped support piece 34 may be connected to the rod-shaped connecting pieces 30, 32 to obtain further support to the frame 36.

The ready-made frame 36 thereby obtains the general shape of a cradle undercarriage.

Figure 2C:
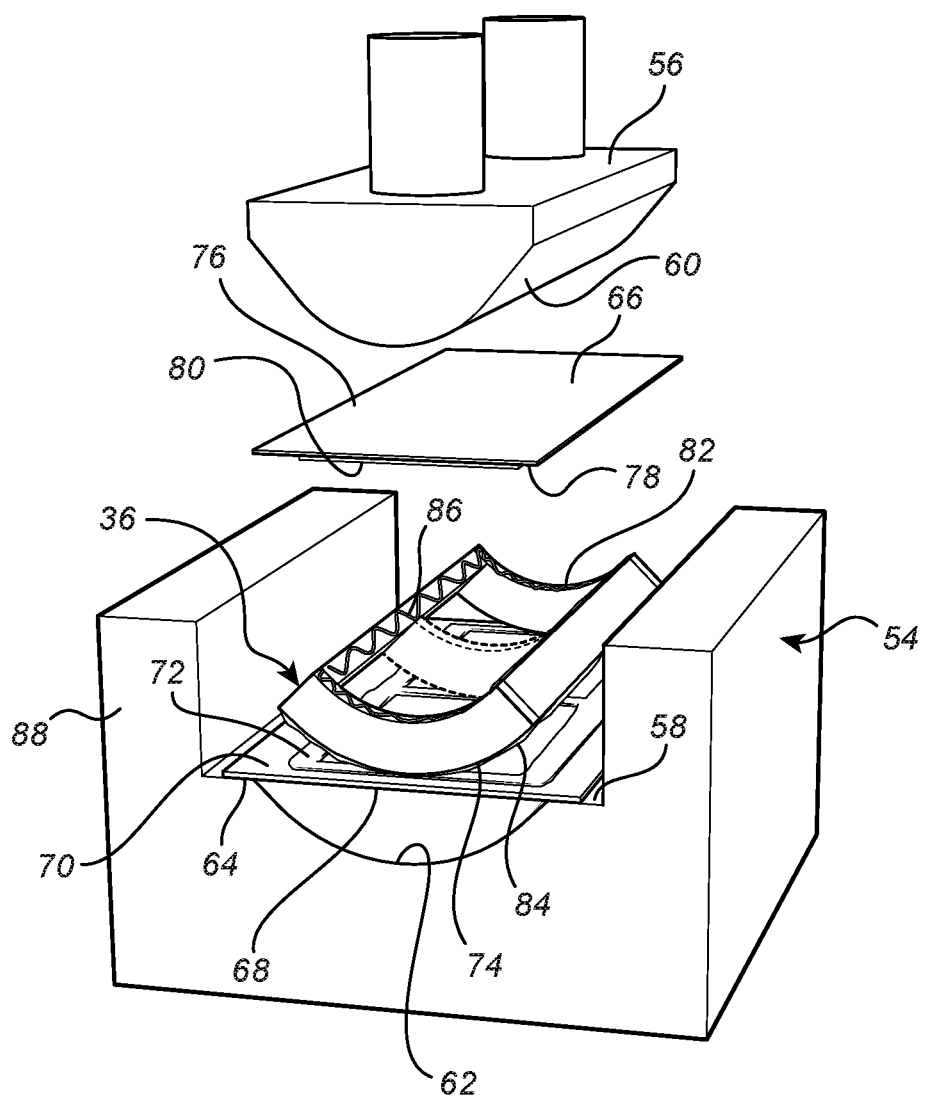
FIG. 2c is a perspective view and illustrates a pressing arrangement for forming the bent corner furniture connecting piece.

FIG. 2c illustrates a pressing arrangement 54 for forming a bent corner furniture connecting piece. The pressing arrangement 54 comprises a stamp 56 and a die 58. The stamp 56 has a convex outer face 60, and the die 58 has a matching concave recess 62. When forming a bent corner furniture connecting piece the frame 36, an outer surface layer 64 and an inner surface layer 66 are introduced into the pressing arrangement 54. Each of the outer and inner surface layers 64, 66 is preferably made from wood or a wooden based material, such as chipboard material, particle board material, MDF board material, HDF board material.

The outer surface layer 64 is placed on top of the concave recess 62 of the die 58. An outer face 68 of the outer surface layer 64 faces the concave recess 62. An inner face 70, which is opposite to the outer face 68, of the outer surface layer 64 may be provided with a layer of glue 72. The layer of glue 72 could, for example, be a heat setting glue or any other type of suitable glue.

The frame 36 is placed on top of the outer surface layer 64, with the convex part 74 of the frame 36 facing the inner face 70 of the outer surface layer 64.

The inner surface layer 66 is placed on top of the frame 36. An outer face 76 of the inner surface layer 66 faces the convex outer face 60 of the stamp 56. An inner face 78, which is opposite to the outer face 76, of the inner surface layer 66 may be provided with a layer of glue 80 and faces the concave part 82 of the frame 36. The layer of glue 80 could, for example, be a heat setting glue or any other type of suitable glue.

Hence, the frame 36, having the shape of a cradle undercarriage, is sandwiched between the outer and inner surface layers 64, 66. Optionally the convex part 74 and/or the concave part 82 of the frame 36 could be provided with respective layers of glue 84, 86. These layers of glue 84, 86 could be provided as alternative to, or in combination with the layers of glue 72, 80 of the surface layers 64, 66.

The pressing arrangement 54 may be provided with a heating system, schematically shown as a heating block 88 by means of which a heating to a temperature of, for example, 50-200° C., can be achieved during the pressing sequence.

Figure 2D:
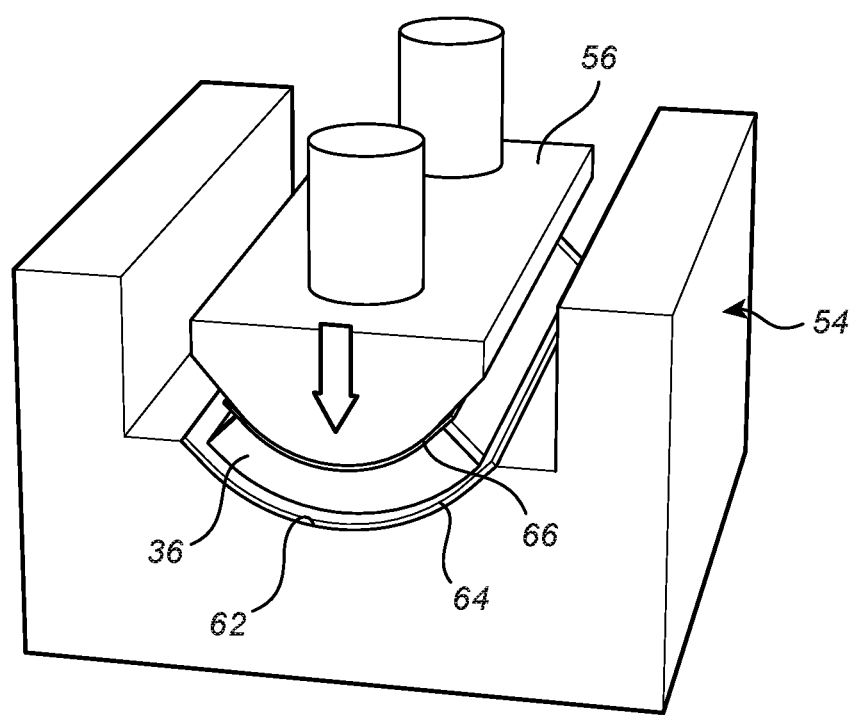
FIG. 2d is a perspective view and illustrates the pressing arrangement when forming the connecting piece.

FIG. 2d is a perspective view and illustrates the pressing arrangement 54 when forming the bent corner furniture connecting piece by pressing, by means of the stamp 56, the inner surface layer 66, the frame 36 and the outer surface layer 64 down into the concave recess 62 to thereby bend the outer and inner surface layers 64, 66 around the frame 36. The stamp 56 maintains the position of FIG. 2d until the glue has set and is then retracted, such that the frame 36 being connected to, and sandwiched between, the surface layers 64, 66 can be removed from the pressing arrangement 54.

Figure 2E:
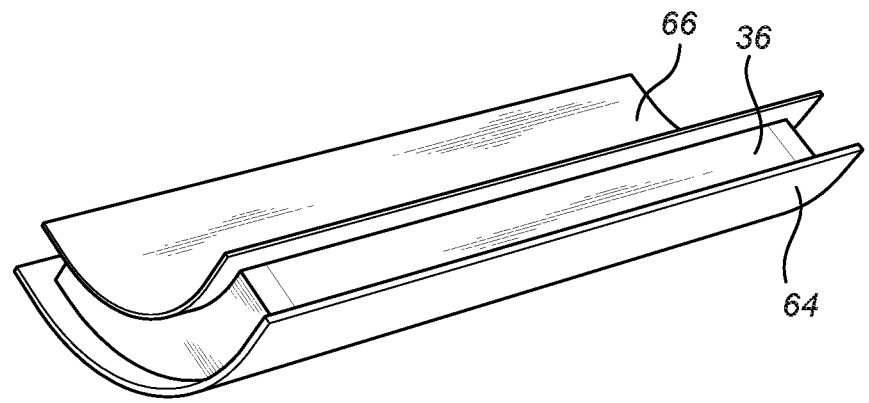
FIG. 2e illustrates the connecting piece after being formed in the pressing arrangement.

FIG. 2e illustrates the frame 36 being sandwiched between the outer and inner surface layers 64, 66 after removal thereof from the pressing arrangement 54. As can be seen the outer and inner surface layers 64, 66 extend beyond the frame 36, as an effect of the outer and inner surface layers 64, 66 being oversized relative to the frame 36. In a cutting step the surface layers 64, 66 and also the frame 36 are machined to obtain well-defined connecting surfaces, as will be described hereinafter with reference to FIG. 2f.

Figure 2F:
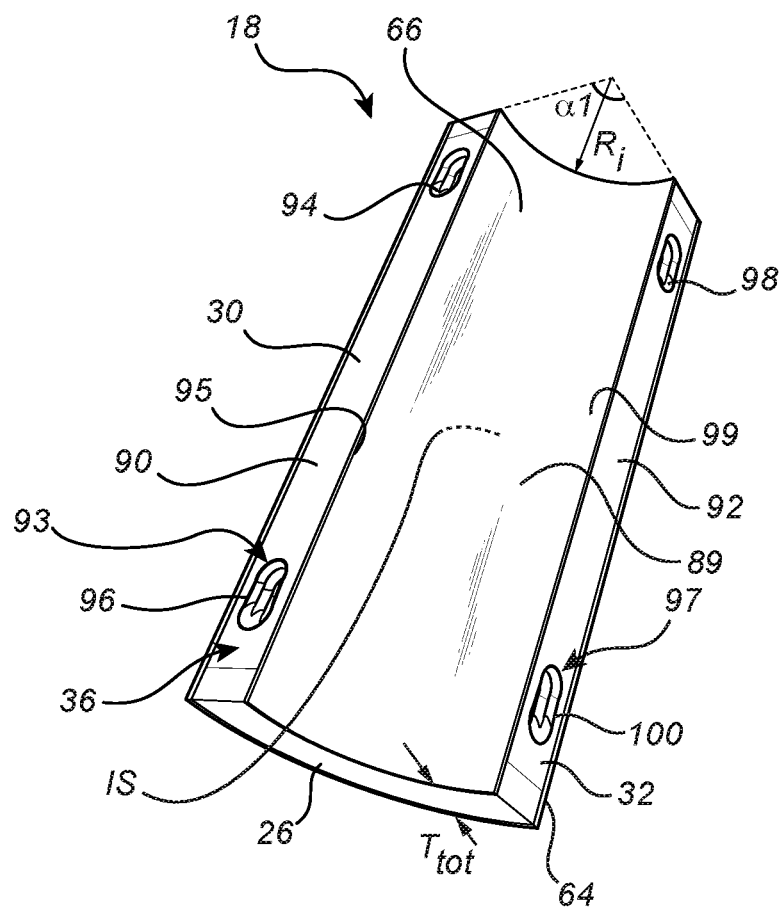
FIG. 2f illustrates the connecting piece having female parts of connecting arrangements arranged therein.

FIG. 2f illustrates the ready-made first bent corner furniture connecting piece 18. At opposite ends of a central bent corner section 89 of the first bent corner furniture connecting piece 18 a machined first connecting surface 90 has been formed in the first rod-shaped connecting piece 30 of the frame 36, and a machined second connecting surface 92 has been formed in the second rod-shaped connecting piece 32 of the frame 36. The first and second connecting surfaces 90, 92 have been machined to narrow tolerances, and are, in this embodiment, at an angle $\alpha 1$ of 90° to each other. In other embodiments, the angle $\alpha 1$ could have other values, such as 25-140°, for example if there is a desire to provide a bent corner which is not at exactly 90°.

Preferably, the ready-made first bent corner furniture connecting piece 18 has an inner radius Ri of 50 to 150 mm, and a total thickness Ttot of 15-50 mm. These dimensions provide for a combination of high strength and low weight.

The ready-made first bent corner furniture connecting piece 18 has a hollow interior space IS, which is formed by the frame 36 and the surface layers 64, 66. The hollow interior space IS in combination with the frame 36 provides the bent corner furniture connecting piece 18 with a low weight, and still maintains a high mechanical stability.

The machined first connecting surface 90 of the first rod-shaped connecting piece 30 is provided with a first connecting arrangement 93 comprising first and second connecting devices in the form of first and second female parts 94, 96 that are arranged at a distance from each other, as seen along the rod-shaped connecting piece 30. The female parts 94, 96 could preferably be formed by milling. Hence, the first connecting arrangement 93 is arranged in a first end 95 of the central bent corner section 89. In accordance with one embodiment the female parts 94, 96 have the general shape of a key hole. In accordance with one embodiment, the female parts 94, 96 could be arranged for snap-in-connection to corresponding male parts, as will be described in more detail hereinafter. For example, the female parts 94, 96 may preferably have a shape of the type described in US 2014/0205373, see FIGS. 14A to 14H of that document. Similarly, the machined second connecting surface 92 of the second rod-shaped connecting piece 32 is provided with a second connecting arrangement 97 comprising first and second connecting devices in the form of first and second female parts 98, 100 that are arranged at a distance from each other, as seen along the rod-shaped connecting piece 32. Hence, the second connecting arrangement 97 is arranged in a second end 99, opposite to the first end 95, of the central bent corner section 89. The female parts 98, 100 could preferably be of a similar design as the female parts 94, 96.

Optionally, the surfaces 64, 66 of the first bent corner furniture connecting piece 18 could be painted, or could be embossed or provided with veneers or foils to obtain a desired visual appearance of the connecting piece 18.

Preferably, the second, third and fourth connecting pieces 20, 22, 24 all have a design which is similar to that of the connecting piece 18.

FIG. 3 illustrates the mounting of the piece of furniture 1 illustrated in FIG. 1. In FIG. 3 it is illustrated how the first bent corner furniture connecting piece 18 is connected to the first side wall 14, but it will be appreciated that the other connecting pieces 20, 22, 24, the second side wall 16, the top and bottom parts 10, 12 are assembled according to similar principles to form the piece of furniture 1.

Hence, in accordance with this principle of assembling the piece of furniture, the first side wall 14 has a machined connecting surface 102. The machined connecting surface 102 of the first side wall 14 is provided with first and second male parts 104, 106 that are arranged in positions that correspond to the positions of the female parts 94, 96. In accordance with one embodiment the male parts 104, 106 have the general shape of a key adapted for co-operation with a key hole female part. In accordance with one embodiment, the male parts 104, 106 could be arranged for snap-in-connection to corresponding female parts 94, 96, as will be described in more detail hereinafter. For example, the male parts 104, 106 may preferably have a shape of the type described in US 2014/0205373, see FIGS. 14A to 14H of that document.

In FIG. 3 it can clearly be seen how the male part 106 is arranged in the machined connecting surface 102 of the first side wall 14, and the female part 96 is arranged in the first connecting surface 90 of the connecting piece 18. The female part 96 has a larger end 108 into which the male part 106 may be inserted in a first step of connecting the first side wall 14 to the connecting piece 18. A smaller end 110 of the female part 96 is provided with ridges 112 that are adapted to cooperate, preferably in a snap-in-connection manner, with grooves 114 of the male part 106 in a second step of connecting the first side wall 14 to the connecting piece 18.

Figure 3B:
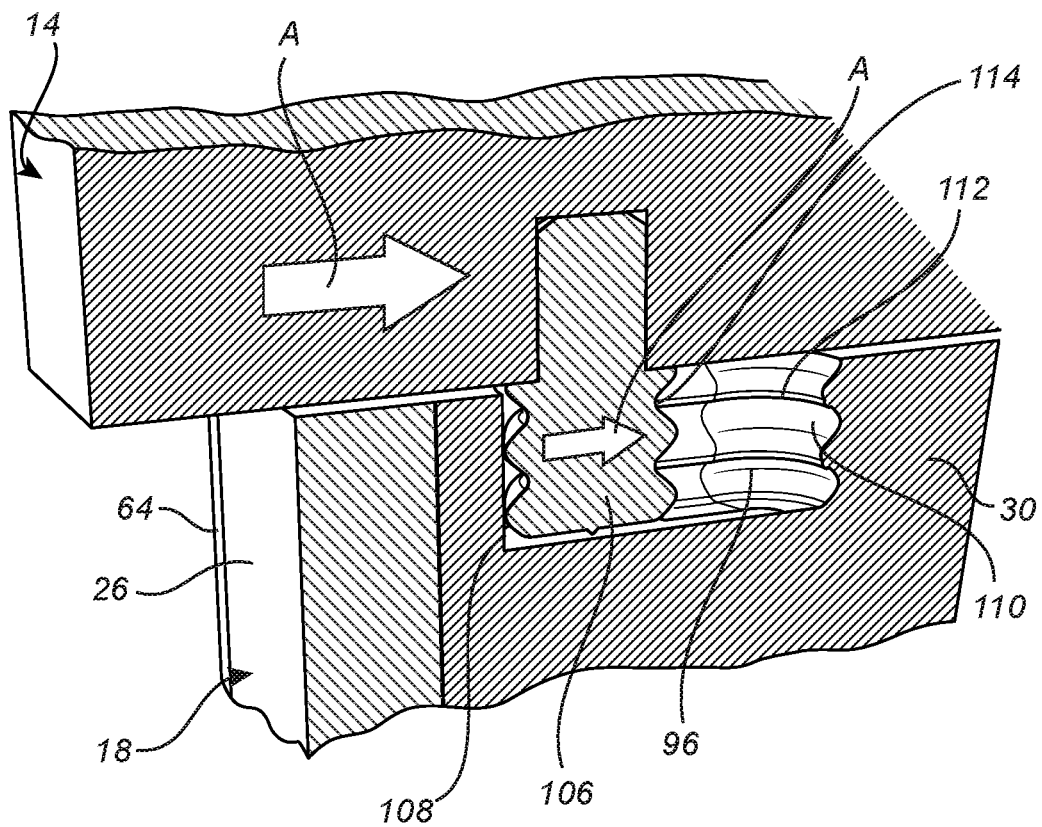
FIG. 3b illustrates a male part inserted in a female part of the connecting piece.

FIG. 3b illustrates, in cross-section, how the male part 106 of the first side wall 14 has been inserted into the larger end 108 of the female part 96, and is subsequently moved, in the direction of the arrows A, toward the smaller end 110 of the female part 96 to make the ridges 112 of the smaller end 110 of the female part 96 cooperate and lock, preferably in a snap-in-connection manner, with the grooves 114 of the male part 106.

Figure 3C:
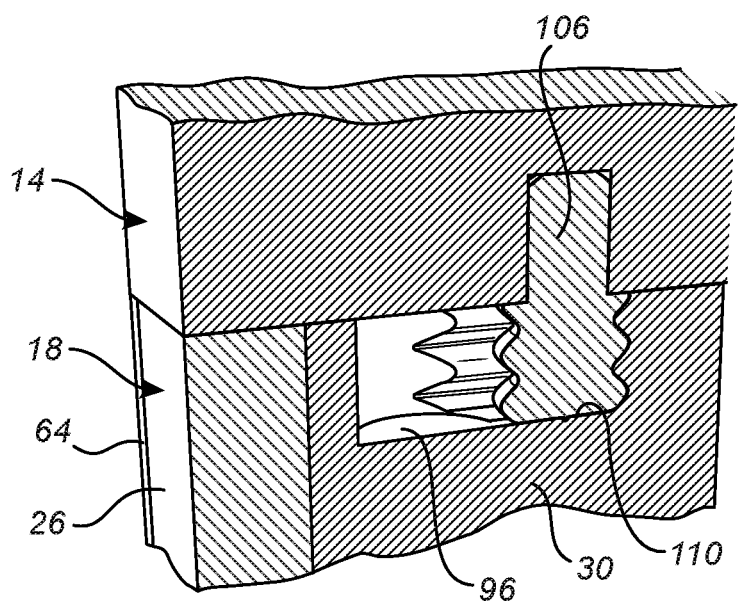
FIG. 3c illustrates the male part locked in the female part of the connecting piece.

FIG. 3c illustrates how the male part 106 is in a locked position inside the smaller end 110 of the female part 96, and the first side wall 14 is thereby locked to the first bent corner furniture connecting piece 18. In a similar manner the bottom and top parts 10, 12 and the side walls 14, 16 are connected to the bent corner furniture connecting pieces 18, 20, 22, 24 to thereby obtain the final cabinet 2 illustrated in FIG. 1.

It will be appreciated that numerous variants of the above described embodiments are possible within the scope of the appended claims.

Hereinbefore it has been described, with reference to, e.g., FIG. 2f, that the first and second connecting arrangements 93, 97 are arranged at an angle α1 of 90° to each other. This is a suitable angle for a bent corner furniture connecting piece adapted for connecting first and second furniture pieces 14, 10 that are to be arranged in a 90° relation to each other. If, for example, first and second furniture pieces are to be in a 135° relation to each other, then the first and second connecting arrangements 93, 97 would be arranged at an angle α1 of 45° to each other. Hence, the first and second connecting arrangements 93, 97 may be arranged at an angle α1 of 25-140° to each other. For many furniture applications first and second furniture pieces 14, 10 are arranged in either a right angled or an obtuse relationship. Hence, the angle α1 is preferably 25-90°.

Hereinbefore it has been described that the first and second connecting arrangements 93, 97 each comprises two connecting devices 94, 96 and 98, 100, respectively. It will be appreciated that the first and second connecting arrangements could also comprise other numbers of connecting devices depending on the required stability. Typically, each of the first and second connecting arrangements would comprise one to six connecting devices, and preferably two to four connecting devices.

Hereinbefore it has been described, with reference to FIG. 2f, that the first and second connecting devices 94, 96 of the first connecting arrangement 93 are entirely formed in the first rod-shaped connecting piece 30, and that the first and second connecting devices 98, 100 of the second connecting arrangement 97 are entirely formed in the second rod-shaped connecting piece 32. According to alternative embodiments, one or more of the connecting devices 94, 96, 98, 100 comprised in the first and second connecting arrangements 93, 97 could be formed partly in the respective rod-shaped connecting piece 30, 32 and partly in another object, for example in the respective end-section piece 26, 28. Hence, the connecting devices 94, 96, 98, 100 comprised in the connecting arrangements 93, 97 are preferably at least partly formed in the respective rod-shaped connecting piece 30, 32.

Hereinbefore it has been described that the consumer mountable piece of furniture is a book case. It will be appreciated that the present invention may be applied also in other pieces of furniture, including for example wardrobes, wall shelves, chests of drawers, television benches, cabinets, sideboards, tables, storage furniture, chairs etc.

To summarize, a bent corner furniture connecting piece (18) comprises a central bent corner section (89) having a first connecting arrangement (93), and a second connecting arrangement (97). The connecting piece (18) comprises a wooden frame (36) comprising a first and a second curved end section piece (26, 28). First and second connecting pieces (30, 32) connect the first and second curved end section pieces (26, 28). The first connecting piece (30) is provided with the first connecting arrangement (93) for connection to a first furniture piece, and the second connecting piece (32) is provided with the second connecting arrangement (97) for connection to a second furniture piece. A bent outer surface layer (64) is arranged on a convex part (74) of said frame (36), and a bent inner surface layer (66) is arranged on a concave part (82) of said frame (36).

The invention claimed is:

1. A bent corner furniture connecting piece comprising:
a central bent corner section, a first connecting arrangement arranged in a first end of the central bent corner section and adapted for connection to a first furniture piece, and a second connecting arrangement arranged in a second end of the central bent corner section, which second end is opposite to the first end, and adapted for connection to a second furniture piece, wherein the first and second connecting arrangements are arranged at an angle of 25-140° to each other, wherein the bent corner furniture connecting piece comprises a wooden frame comprising a first curved end section piece and a second curved end section piece, a first connecting piece connecting the first and second curved end section pieces at respective first ends thereof, and a second connecting piece, which is parallel to the first connecting piece, connecting the first and second curved end section pieces at respective second ends thereof, said second ends being opposite to said first ends of said curved end section pieces, wherein said first connecting piece is provided with at least a part of the first connecting arrangement for connection to a first furniture piece, wherein said second connecting piece is provided with at least a part of the second connecting arrangement for connection to a second furniture piece, wherein a bent outer surface layer is arranged on a convex part of said frame, and wherein a bent inner surface layer is arranged on a concave part of said frame so that the outer surface layer is spaced from the inner surface layer by the first connecting piece, the second connecting piece, the first curved end section, and the second curved end section.

2. A bent corner furniture connecting piece according to claim 1, wherein the first connecting arrangement is arranged for snap-in-connection to the first furniture piece.

3. A bent corner furniture connecting piece according to claim 2, wherein the second connecting arrangement is arranged for snap-in-connection to the second furniture piece.

4. A bent corner furniture connecting piece according claim 1, wherein the first connecting arrangement comprises at least a first connecting device of which at least a part is arranged in the first connecting piece, and wherein the second connecting arrangement comprises at least a first connecting device of which at least a part is arranged in the second connecting piece.

5. A bent corner furniture connecting piece according to claim 4, wherein the first connecting devices of the bent corner furniture connecting piece are arranged for snap-in-connection to the first and second furniture pieces, respectively.

6. A bent corner furniture connecting piece according claim 1, wherein the first and second connecting arrangements are arranged for releasable connection to the first and second furniture pieces, respectively.

7. A bent corner furniture connecting piece according to claim 1, wherein the first and second connecting arrangements of the bent corner furniture connecting piece each comprises one part of a female-and-male connecting arrangement.

8. A bent corner furniture connecting piece according to claim 7, wherein at least the first connecting arrangement of the bent corner furniture connecting piece comprises at least one female part.

9. A bent corner furniture connecting piece according to claim 1, wherein at least the first connecting arrangement of the bent corner furniture connecting piece comprises one part of a key and key hole connecting arrangement.

10. A bent corner furniture connecting piece according to claim 1, wherein the inner and outer surface layers are made from wood or a wooden based material, such as chipboard material, particle board material, MDF board material, HDF board material.

11. A bent corner furniture connecting piece according to claim 1, wherein the bent corner furniture connecting piece has an inner radius of 50 to 150 mm.

12. A bent corner furniture connecting piece according to claim 1, wherein the bent corner furniture connecting piece has a total thickness of 15-50 mm.

13. A bent corner furniture connecting piece according to claim 1, wherein the bent corner furniture connecting piece has a hollow interior space.

14. A method of forming a bent corner furniture connecting piece adapted for connection to a first furniture piece and to a second furniture piece in the assembly of a piece of furniture, the method comprising:

forming a wooden frame by connecting a first connecting piece to first and second curved end section pieces at respective first ends thereof, and connecting a second connecting piece to the first and second curved end section pieces at respective second ends thereof, applying an outer surface layer on a convex part of said frame, applying an inner surface layer on a concave part of said frame so that the outer surface layer is spaced from the inner surface layer by the first connecting piece, the second connecting piece, the first curved end section, and the second curved end section, arranging at least a first connecting arrangement, adapted for connection to a first furniture piece, at least partly in the first connecting piece, and arranging at least a second connecting arrangement, adapted for connection to a second furniture piece, at least partly in the second connecting piece.

15. A method according to claim 14, wherein the outer and inner surface layers are glued to the frame.

16. A method according to claim 14, wherein said steps of applying an outer surface layer on a convex part of said frame and applying an inner surface layer on a concave part of said frame involves sandwiching the frame between the outer and inner surface layers and pressing the sandwiched structure obtained thereby in a pressing arrangement comprising a die and a stamp.

17. A method according to claim 16, wherein said step of pressing the sandwiched structure further involves heating the sandwiched structure to a temperature in the range of 50-200° C.

18. A method according to claim 16, wherein a layer of glue is applied on the frame and/or on the outer and/or inner surface layers prior to pressing the sandwiched structure.

19. A method according to claim 16, wherein the frame is sandwiched between oversized outer and inner surface layers that are subsequently machined to fit with the frame.

20. A method according to claim 14, wherein said step of arranging at least a first connecting arrangement for connection to a first furniture piece in the first connecting piece includes milling at least one female part at least partly in the first connecting piece.

21. A consumer mountable piece of furniture, comprising at least one bent corner furniture connecting piece comprising:

a central bent corner section, a first connecting arrangement arranged in a first end of the central bent corner section and adapted for connection to a first furniture piece, and a second connecting arrangement arranged in a second end of the central bent corner section, which second end is opposite to the first end, and adapted for connection to a second furniture piece, wherein the first and second connecting arrangements are arranged at an angle of 25-140° to each other, wherein the bent corner furniture connecting piece comprises a wooden frame comprising a first curved end section piece and a second curved end section piece, a first connecting piece connecting the first and second curved end section pieces at respective first ends thereof, and a second connecting piece, which is parallel to the first connecting piece, connecting the first and second curved end section pieces at respective second ends thereof, said second ends being opposite to said first ends of said curved end section pieces, wherein said first connecting piece is provided with at least a part of the first connecting arrangement for connection to a first furniture piece, wherein said second connecting piece is provided with at least a part of the second connecting arrangement for connection to a second furniture piece, wherein a bent outer surface layer is arranged on a convex part of said frame, and wherein a bent inner surface layer is arranged on a concave part of said frame, and the at least one bent corner furniture connecting piece is manufactured by:

forming a wooden frame by connecting a first connecting piece to first and second curved end section pieces at respective first ends thereof, and connecting a second connecting piece to the first and second curved end section pieces at respective second ends thereof, applying an outer surface layer on a convex part of said frame, applying an inner surface layer on a concave part of said frame so that the outer surface layer is spaced from the inner surface layer by the first connecting piece, the second connecting piece, the first curved end section, and the second curved end section, arranging at least a first connecting arrangement, adapted for connection to a first furniture piece, at least partly in the first connecting piece, and arranging at least a second connecting arrangement, adapted for connection to a second furniture piece, at least partly in the second connecting piece, a first furniture piece connectable to the first connecting arrangement of the connecting piece, and a second furniture piece connectable to the second connecting arrangement of the connecting piece.

\* \* \* \* \*